F. A. HART.
COMBINED TYPE WRITING AND COMPUTING MACHINE.
APPLICATION FILED JAN. 14, 1916.
1,325,469.
Patented Dec. 16, 1919.
5 SHEETS—SHEET 1.
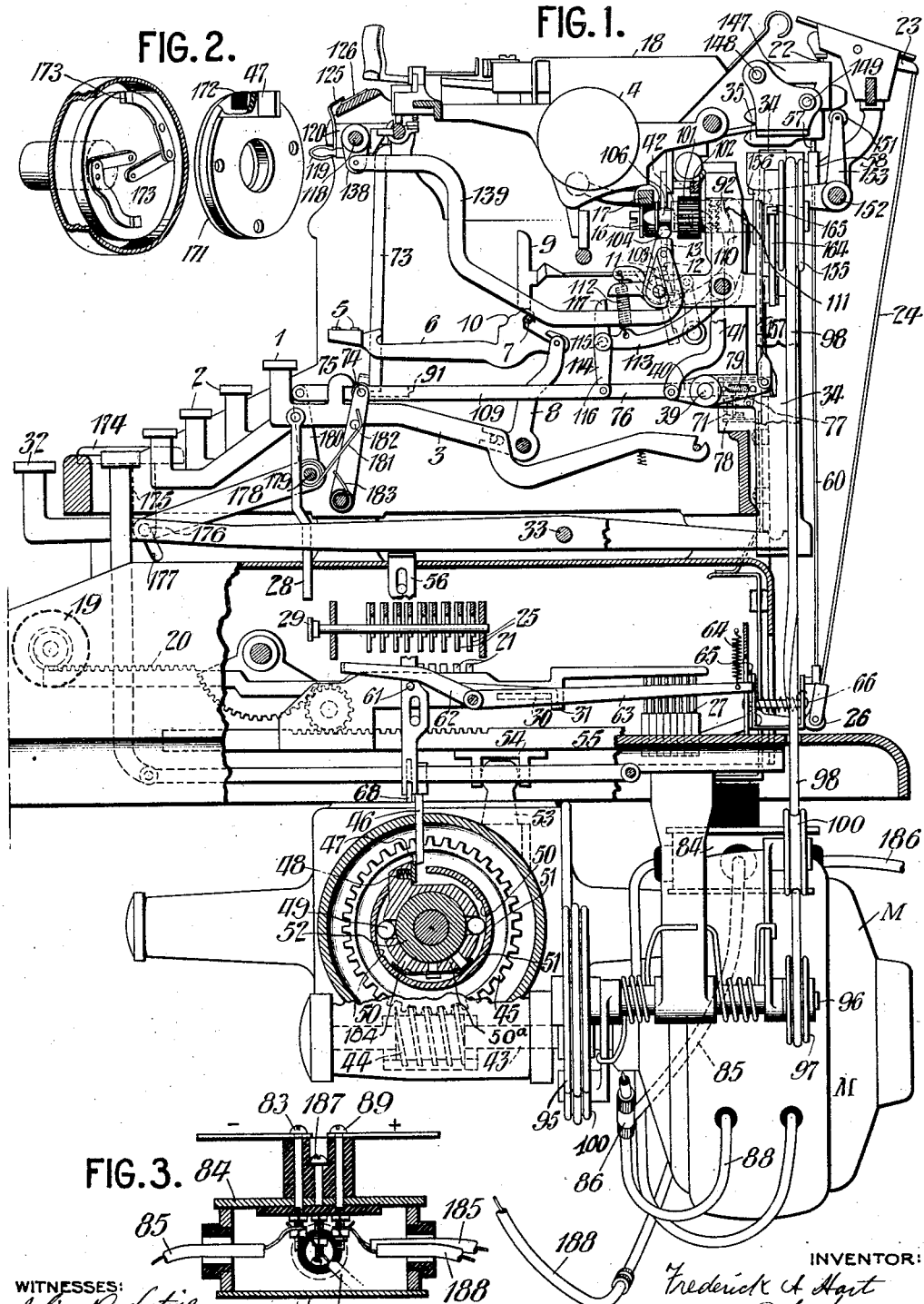

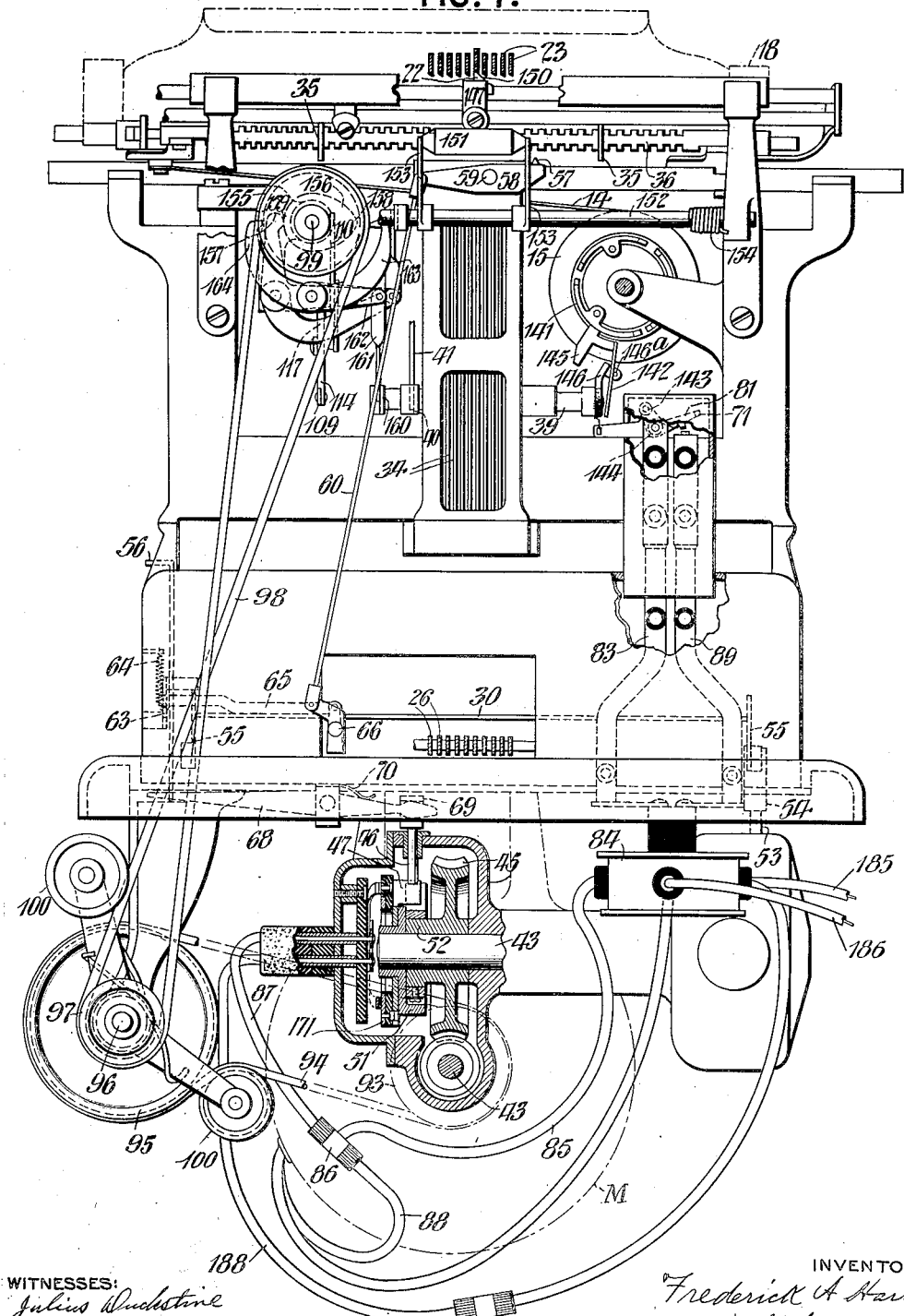

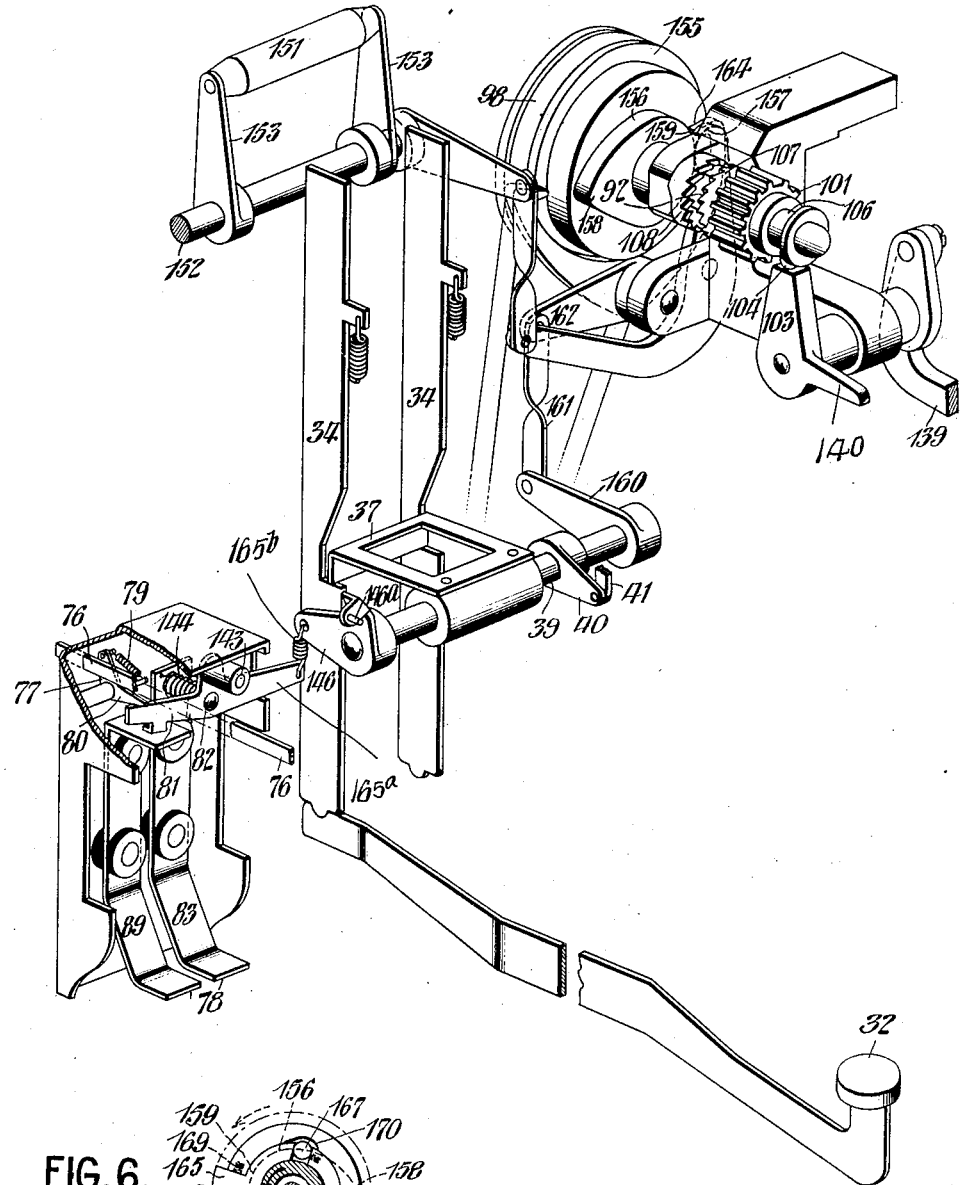

F. A. HART.
COMBINED TYPE WRITING AND COMPUTING MACHINE.
APPLICATION FILED JAN. 14, 1916.
1,325,469. Patented Dec. 16, 1919.
5 SHEETS—SHEET 4.
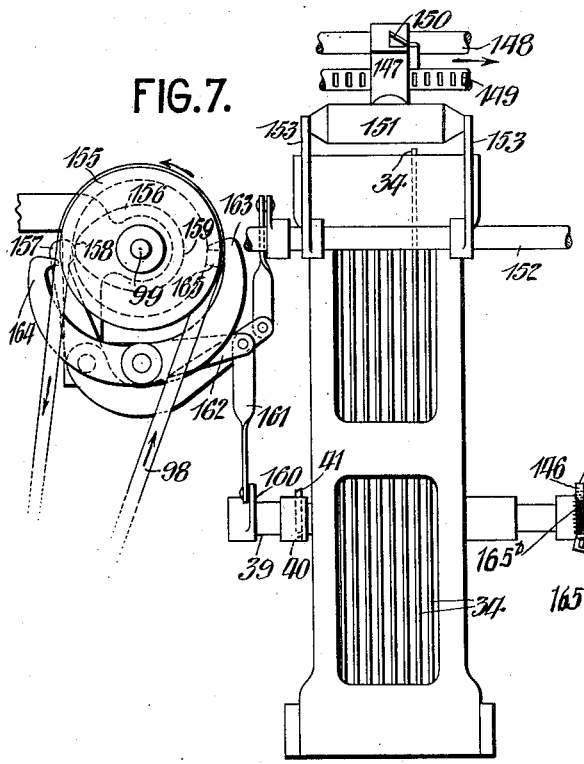
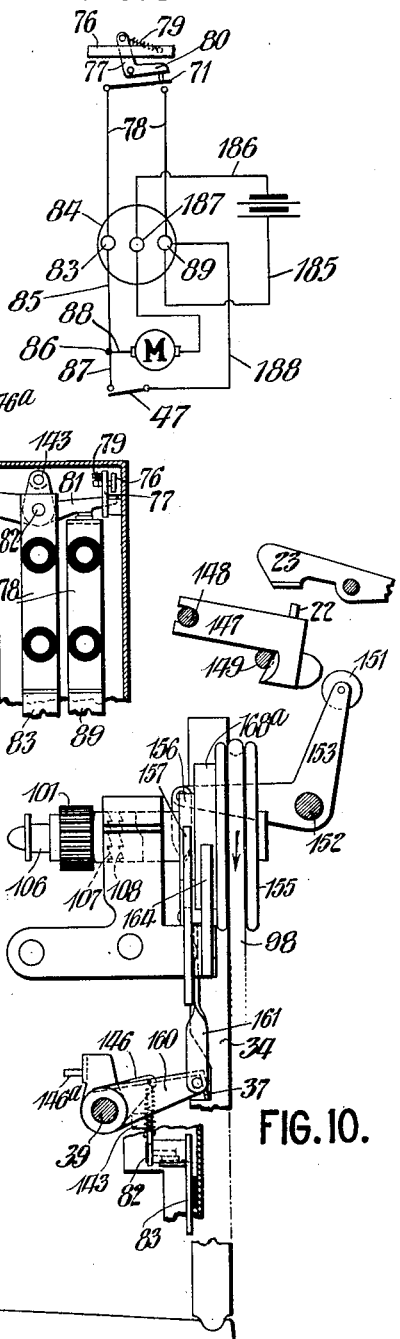
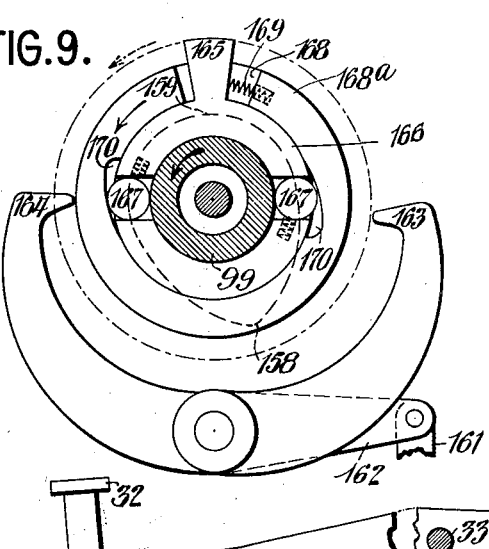
INVENTOR:
Frederick A. Hart
BY B. C. Stickney
ATTORNEY.
WITNESSES:

F. A. HART.
COMBINED TYPE WRITING AND COMPUTING MACHINE.
APPLICATION FILED JAN. 14, 1916.

1,325,469.

Patented Dec. 16, 1919.
5 SHEETS—SHEET 5.

INVENTOR:
Frederick A. Hart
BY B. C. Stickney
ATTORNEY.

WITNESSES:
Julius Duckstein
Arthur A. Johnson.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,325,469.     Specification of Letters Patent.     Patented Dec. 16, 1919.

Application filed January 14, 1916. Serial No. 72,014.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

My invention relates to computing machines, and is herein disclosed as applied to a combined typewriting and computing machine of the Underwood-Hanson type, wherein the numeral keys of the typewriter set up in a temporary register the numbers to be computed as said numbers are written, and later said register is actuated by a separate source of power for the purpose of carrying the registered numbers into the computing wheels of a totalizer. In operating such a machine, it has been found that if accurate work is to be done, every possible extra load must be taken off the fingers of the operative, this being partly due to the fact that such machines are used to increase the efficiency of work in bookkeeping, and consequently to justify the capital invested in them, the machines must be capable of extremely rapid and accurate work, and greatly enhance the efficiency of the operative or bookkeeper.

In a co-pending case No. 824,429, filed March 13, 1914, (now Patent No. 1,238,908, dated September 4, 1917), I have shown how the motor, which is usually used for the operation of such combined typewriting and computing machines, as has been described above, may be utilized for returning the carriage, in addition to driving the computing mechanism. This takes off the mind of the operative one of the disconcerting operations requiring attention while copying a column of numbers. One especial utility of this carriage-return is the fact that it enables the operative, after finishing the copying of a number, to let the typewriter carriage take care of itself while keeping clearly in her mind the next number to be copied.

According to the present disclosure of my invention, this carriage-return may be associated with an automatic line-spacing mechanism, and this line-spacing mechanism may be operated by the arrest of the carriage when returning to begin a new line. If thus arrested, the line-space operation is equivalent to a noiseless buffer thus decreasing both the labor and the noise and wear incident to the operation of the machine.

It has been found advantageous to relieve the mind of the operative of other operations, especially those which have heretofore been necessary at the moment of beginning to copy a new figure onto the worksheet. One of these operations, which is usually done at this time, is to depress a tabulating key for the purpose of positioning the carriage at the correct denomination ready for the writing of the next number. In a typewriting machine, the depression of a tabulating key, for this purpose, may be a light operation, but in computing machines, the depression of the tabulating key frequently becomes a heavy operation, partly owing to the fact that it has been found advantageous to silence the denomination-selecting mechanism of the computing machine while the carriage is traveling during a tabulating operation, because the noise is disconcerting to the operative and the wear to the machine is not only considerable, but entirely unnecessary.

One of the advantages of the present invention, therefore, is to make the touch of the tabulating keys as easy as possible, and for this purpose certain of the functions incident to the operation of these keys are performed by the source of power, so that said source of power will do all the necessary real labor.

Other features and advantages will hereinafter appear.

In the accompanying drawings,

Figure 1 is a sectional side view of an Underwood-Hanson electrically-driven combined typewriting and computing machine, showing my invention as applied thereto.

Fig. 2 is a perspective view, showing the parts of a rotary electric contact separated out for the purpose of clearness.

Fig. 3 is a section through a wire-splicing box.

Fig. 4 is a rear view of most of the parts seen in Fig. 1.

Fig. 5 is a skeleton perspective view, showing some of the principal connections from the tabulating keys.

Fig. 6 is a rear view, partly in section, of a silencing cam controlled by the tabulating keys, and the escapement by which it is controlled, showing the parts when a tabulating key has been released.

Fig. 7 is a rear view of the parts seen in Fig. 5.

Fig. 8 is a diagrammatic view of the electric connections.

Fig. 9 is a view similar to Fig. 6, but showing the same parts a moment earlier.

Fig. 10 is a sectional side view of the parts seen in Fig. 5, showing a tabulating key depressed.

Figure 11:
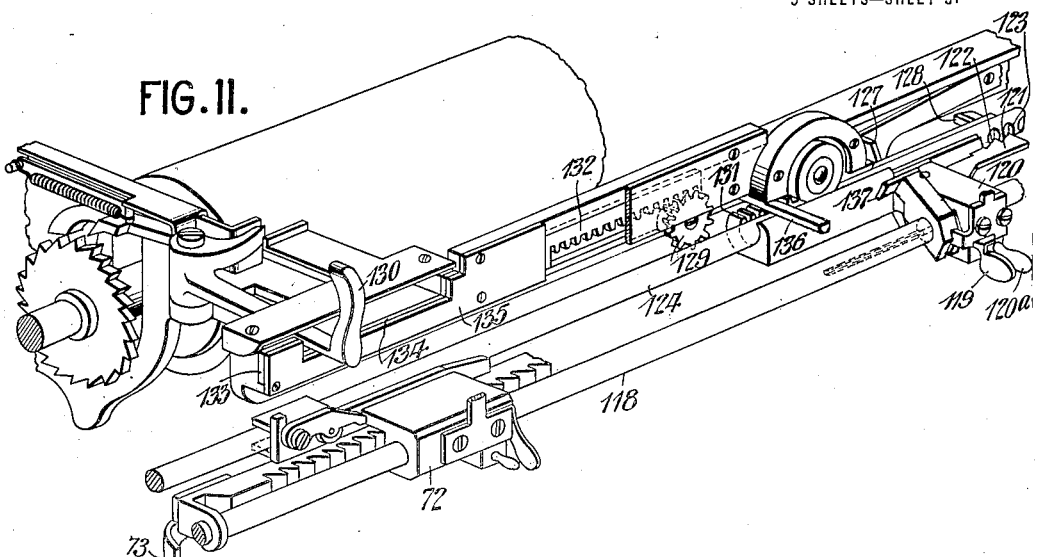
Fig. 11 is a perspective view of the margin stops of the typewriter carriage and associated parts.
Figure 12:
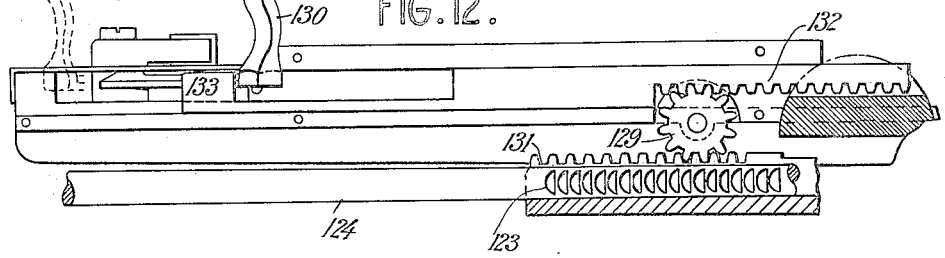
Fig. 12 is a front view of part of Fig. 11.
Figure 13:
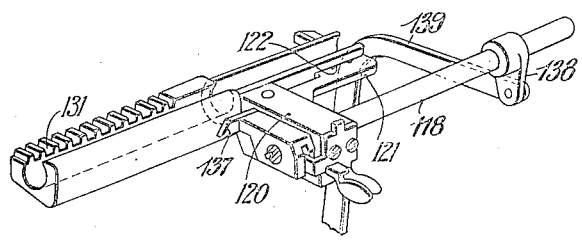
Fig. 13 is a perspective view of some of the connections between the right-hand margin stop and its connections to the clutch.

In the usual Underwood-Hanson combined typewriting and computing machine numeral keys 1 and alphabet keys 2 are mounted on the front ends of key levers 3, and, when depressed, carry types 5 mounted on the ends of type-bars 6, upwardly and rearwardly to print against the front of a platen 4, said type-bars being journaled on the usual segment ring 7, and the key levers 3 being connected to said type-bars 6 by the usual elbow levers 8.

Whenever a type-bar approaches the platen it operates a universal bar 9 by means of a heel 10 and causes said universal bar to swing dogs 11 and 12 to alternately engage the usual escapement wheel 13, thus permitting the carriage to be drawn along by the usual belt 14 attached to a spring barrel 15. The escapement wheel controls the carriage through a pinion 16 to which it is connected, said pinion meshing with the usual pivoted rack 17 on the typewriter carriage 18 on which the platen 4 is mounted.

The usual Underwood-Hanson machine also includes dial or computing wheels 19 which are turned after all the digits of a given number have been set up, and in so turning, add the number. For setting up the numbers to enable them to be added, there is provided a rack bar 20 for each computing wheel 19, and said rack bars are driven by a general operator to turn said computing wheels 19. For the purpose of determining how far said rack bars shall turn said wheels, each rack bar is provided with the usual series of pins 21, there being a separate pin corresponding to each numeral key of the typewriter on each of the rack bars, and in the adding zone each numeral key, when depressed, will set up a digit on the rack bar corresponding to the typewriter letter-space at which it is actuated; doing this by depressing its pin 21 on the rack bar which is momentarily selected.

To accomplish this, the rack bars are selected by the usual tappet 22 or denomination-selector mounted on the typewriter carriage, and adapted to ride under a series of jacks 23, there being one jack 23 for each rack bar 20, each jack being connected to its rack bar 20 by a rod or wire 24 which lifts the rack bar 20 from its normal position shown in Fig. 1, to a position where its pins 21 are within the range of pin-setting bars 25. The rods 24 do this, because at their lower ends they engage the rear ends of levers 26 of which the forward ends engage the respective elements of the usual transposition device 27, and the members of the transposition device lift the rack bars 20; this mechanism being of the general type shown in my co-pending application, Serial No. 466,836, filed December 10, 1908, (now Patent No. 1,270,411, dated June 25, 1918).

Whenever any rack bar 20 is raised so that its pins 21 are within the range of the pin-setting bars 25, as above described, a pin is set thereon by depressing a numeral key 1. The connections for doing this include the usual pendent 28 depending from the numeral key, and adapted whenever its numeral key is struck to descend and rock by means of a rock arm its rock shaft 29, said rock shaft being connected in the usual manner to swing downwardly its pin-setting bar 25, and thereby set its pin 21 on the rack bar 20, which is raised at the moment.

When all of the digits of a number have been written and set up on the pins 21, said numbers are carried into the computing wheels 19 by actuating the general operator which includes the usual cross-bar 30, said cross-bar coming forward and carrying along the various rack bars 20 by means of the pins projecting therebelow. The rack bars 20 are restored to their normal position by the cross-bar 30, which carries them back by lugs 31 on the rack bar.

The mechanism includes the usual pawl-and-ratchet connections between the computing wheels 19 and the rack bars 20, and the pin-restoring device, not shown herein. The general operator is actuated from an electric motor M in a manner hereinafter described, it being sufficient at this time to say that said operator is of the usual reciprocating type found in this kind of machines.

If it is desired to rapidly position the typewriter carriage to begin writing a new number, this may be done by depressing the appropriate one of the usual decimal tabulating keys 32, said keys pivoted intermediate their ends at 33, and adapted to raise the usual plunger counter-stops 34 at their rear ends into the path of the usual column stops 35 settable on the usual carriage rack bar 36. In order to enable these keys to automatically and rapidly position the typewriter carriage, the machine is provided with the usual Underwood decimal tabulator attachments, which include a universal bar 37 overlying a ledge 38 on each counter-stop 34, with the result that whenever any one of said counter-stops is raised by the depression of its key 32, said universal bar is rocked, rocking its rock shaft 39, causing said shaft to free the typewriter carriage from its escapement mechanism. To do this, the shaft 39 is provided with the usual rock arm 40 to which is pivoted the usual link 41, so that when the shaft is rocked, said link is drawn down and rocks the usual lever 42 to cause the roll at the front end of said lever to lift rack 17 out of the pinion 16, thereby releasing the carriage from its escapement, and allowing the spring barrel 15 to draw the carriage along until said carriage is arrested by the column stop 35, when it collides with the counter-stop 34, which has been elevated by its depressed key 32.

The present invention is shown as an improvement on applicant's co-pending case, No. 824,429, above referred to, wherein the usual Underwood-Hanson combined typewriting and computing mechanism is shown as including the motor M above described, which, through the usual Underwood-Hanson connecting means, drives the general operator. The motor is connected to the usual shaft 43 which by the worm 44 fast thereon, drives the driving gear 45, and this gear, by means of the usual clutch which is controlled by the usual pin 46 connects and disconnects the motor from the general operator which includes the cross-bar 30. The connections are of one of the usual types wherein whenever the pin 46 is raised, a conductor bridge connected to a lug 47 is caused to jump forward by means of the spring 48, and close a circuit through the motor M. The motor by starting carries the clutch rolls 49 to effective position where they jam the clutch parts together, said rolls being normally held by a roll carrier 50ª in the position seen in Fig. 1, wherein they occupy pockets 50 in the ring 51. The gear wheel 45 has a clutch member in the form of a hub 52 which extends axially within the ring 51, and therefore, whenever the motor is turning, constantly turns, tending to carry the rolls 49 around to locking or jamming position because of the slight friction, which it usually has with the rolls. For this purpose the motor always drives the gear wheel 45 and the hub 52 in clockwise direction, as viewed in Fig. 1. Whenever the controlling pin 46 is lifted, therefore, the rolls 49 will be carried around out of the pockets 50 to a position where they jam between the rotating hub 52 and the ring 51, and cause such ring to be carried around by the motor. This ring 51 is connected by means of the usual sliding pitman connections in such a way that it reciprocates an arm 53 which engages a yoke 54 formed on one of the rack bars 55 of the general operator. This arm 53 then will reciprocate the general operator whenever the pin 46 is lifted, provided the motor is turning.

The connections are such, however, that the motor is normally idle because it is run by a normally open circuit, but whenever the pin 46 is raised, the circuit is automatically closed, thus starting the motor. The starting pin 46 may be controlled, if desired, from the usual manually operated key 56, but is also adapted to be controlled from the typewriter carriage. For this purpose, the typewriter carriage has column stops 35 of such shape that they are adapted to operate a one-way starting dog 57 like that shown in the application of Ogden Minton, Serial No. 797,714, filed October 28, 1913, (now Patent No. 1,280,065, dated September 24, 1918). This dog is formed on one end of a lever 58 pivoted intermediate its ends at 59 and connected at the end opposite the dog 57 to a draw link 60 which controls the starting key 56. To enable the link 60 to operate it, the starting key has a pin 61 thereon lying under a forwardly extending lever 62 of which the rear end 63 is tensioned upwardly, by a spring 64. This spring, however, is normally unable to draw up on said lever, and actuate the starting key 56, this being so because it is normally held down by a holding bar 65 which overlies it and is operated by the link 60, as shown in said Minton patent. The connections between the link 60 and the holding bar 65 include a rock shaft 66 having one arm pivoted to the draw-link 60 and the other arm pivoted to said holding bar 65. The result of these connections is that as the typewriter carriage reaches the end of an adding column, the one-way dog 57 will draw upward the draw-link 60, withdraw the holding bar 65 and permit the rear end of the lever 62 to be drawn upward by its spring 64. This depresses the starting key 56, as best shown in Fig. 4, said starting key lifting the pin 46 by means of a lever 68, pivoted intermediate its ends, and underlying the starting key 56 at one end, and engaging a slotted lug 69 at the top of the pin 46 at the other end. A spring 70 normally holds the starting pin down in its effective position, where it holds the clutch released. The lever 62 which controls the starting pin is restored to its normal position so that the bar 65 will overlie it by means not material to the present invention, but including a cam on the general operator, shown in said co-pending application Serial No. 797,714. In addition to the circuit closer controlled by the starting pin 46, there is a second circuit closer 71, also adapted to start the motor, said second circuit closer, however, being totally ineffective on the general operator 30 and the driving devices therefor. This circuit closer is part of the carriage return mechanism, from one point of view, and the connections operating said circuit closer may be identical with those in my co-pending application, Serial No. 824,429, filed March 13, 1914, wherein the usual left-hand margin stop 72 of the Underwood typewriting machine (one form of which is disclosed in the patent to Pfunder & Cook, No. 853,562, dated May 14, 1907) is adapted to rock forwardly an extending arm 73 fast on the rack by which the margin stop is usually adjusted.

When the carriage reaches the letter-space in its travel at which it is desired to return it, the margin stop 72, in the manner described in my co-pending application No. 824,429 aforesaid, swings the arm 73 toward the front of the machine and closes the switch 71 by connections which will now be described.

These connections include the ordinary locking bail 74, which locks the typewriter alphabet and numeral keys 2 and 1 in the ordinary Underwood machine by means of the usual hooks 75. The arm 73 is effective on this bail to swing it forward under the hooks 75 substantially as in the usual Underwood typewriting machine. The swinging of the locking bail 74 closes the switch 71 by drawing on a link 76, thus swinging a bell crank 77 to close the switch 78 which forms part of the circuit closer 71. The bell crank 77 is connected to the link 76 by a coil spring 79 attached to the upper end of said bell crank. The lower end of the bell crank includes a forwardly extending arm 80 overlying the end 81 of a lever which is pivoted at 82 and forms the closing member of the switch 78. For this purpose lever 81 with its pivot 82 forms a part of the electric terminal 83 which rises from the bottom of the machine where it terminates in a junction box 84. From this junction box a cable 85 extends toward the motor, said cable terminating in a double snap connection 86 so that it connects with the cable 87 leading to the electric bridge of the motor and with another cable 88 coming direct from the motor. A terminal 89 forming part of the switch 71 extends down into the junction box 84, and is connected to the other branch 85ª of the circuit which furnishes the power for operating the motor. The link 76 is able to be operated if necessary independently of the arm 73, and bail 74, this being possible because the bail 74 only engages link 76 by the end of a notch 91 in the link 76. The drawing forward of the link 76, although it starts the motor, does not, because of that reason only, cause the return of the carriage. This being so, because of the fact that there is a normally open clutch 92 between the motor and the carriage.

Whenever the motor is turning it drives one end of said clutch 92, and in a manner later to be described the starting of the motor by the margin stop 72 will close the clutch 92 and cause the carriage to return. The connections between the motor and the clutch include a pulley 93, fast on the shaft 70 of the motor, said pulley driving a belt 94 which passes around a pulley 95 fast on a counter shaft 96 and this counter shaft extends to the rear of the machine, where there is a pulley 97 which drives a belt 98 extending upwardly to the shaft 99 which forms part of the clutch 92. The belts 94 and 98 are each provided with idle spring-held tensioning pulleys 100.

Whenever the motor is turning, the shaft 99 turns, and if the link 76 has been moved forwardly the clutch 92 will turn, causing the pinion 101 to turn, because the clutch 92 has in the meantime been automatically closed. The turning of the pinion 101 returns the carriage because the said pinion is constantly in mesh with a rack 102 which is connected to the carriage. The connections for causing the clutch 92 to seize, include a bell crank 103 having an extension 104 which runs in an annular slot 106 on the hub of the pinion 101. Whenever the bell crank 103 swings its upwardly extending arm rearwardly, it carries the toothed member 107 of the clutch into engagement with the toothed clutch member 108 which is fast on the shaft 99, and because the toothed member 107 is fast on the hub of the pinion 101, the shaft 99 will drive said pinion to return the carriage. For convenience of construction the clutch 92 is not under control of the link 76 because the said link is at the side of the machine, whereas it is found convenient to locate the carriage return mechanism at the opposite side of the machine (as best seen in Fig. 4). The clutch, therefore, is controlled by a clutch-controlling link 109 which is connected to the locking bail 74, so that it moves backwardly and forwardly therewith. In order to take the load of operating the clutch 92 off said link and at the same time make the action of the clutch positive, the clutch 92 is operated by the motor M. One reason for this is the fact that the clutch must be closed in a single letter-space travel of the typewriter carriage, this taking considerable power. The means for operating the clutch 92 include a tappet 110, which is pivoted intermediate its ends and has its following end bearing against a cam 111 on the rear side of the clutch member 108, with the result that, as the shaft 99 of the clutch revolves, the tappet 110 is vibrated by said cam. This tappet 110 is prolonged forwardly at its bottom where it has a spring 112 which draws on a swinging arm 113. Thus said spring 112, as the tappet 110 is vibrated by its cam 111, will alternately tension and relax, and tend to draw up the pivoted arm 113. This pivoted arm 113 forms a floating support for a lever 114, which is pivoted thereto at 115, and which is pivoted at its lower end 116 to the link 109. The connection is such that when the link 109 is pushed rearwardly it holds the lever 114 in an ineffective position. In this position the rotating cam 111 tensions the spring 112 and relaxes it idly. When, however, the link 109 is pulled forwardly, it causes the vibrations of the tappet 110 to close the clutch, because (as is more clearly shown in my Patent No. 1,238,908) it swings the upper end 117 of the lever 114 under the bell crank 103, which as described above operates the clutch 92. The rocking of the tappet 110 then lifts up the bell crank member 103 and forcibly closes the clutch. The clutch seizes by means of flat-faced teeth, and the friction of these on each other causes the clutch to remain closed and drive the carriage until the carriage is arrested by a right-hand margin stop which is substantially of the form shown in the co-pending application of Fred Walsleben, Serial No. 803,454, filed November 28, 1913, (now Patent No. 1,262,604, dated April 9, 1918).

Said margin stop includes substantially the usual Underwood adjustable margin stop which is slidable along a rod 118, by means of a finger piece 119. The body 120 of the margin stop as usual embraces said rod 118, and a second finger piece 120ª is connected to a pivot extension 121 of said stop, which has teeth 122 coöperating with teeth 123 on the usual rod 124, to lock the margin stop in any adjusted position. This margin stop, like the left-hand margin stop, is provided with the usual pointer 125 along the usual scale 126 of the Underwood typewriter machine.

When the carriage is returned to the point at which it is to be arrested at such margin stop, the usual manually releasable pivoted lug 127 catches against a fixed lock 128, on the margin stop to arrest the carriage. Just before this takes place, a pinion 129 forming part of the carriage, causes the ordinary line-spacing handle 130 of the Underwood machine to line-space the platen. Said pinion 129 effects this line-spacing because it strikes a rack 131 forming a part of an extension of said margin stop and is rotated thereby, with the result that the pinion 129 drives a rack 132 on a line-spacing slide on the typewriter carriage. This slide 132 includes a lug 133, which is shaped to catch on the usual line-space lever 130, and drags said lever to the right and line-spaces the carriage by the usual pawl. On this rack 132 is an extension 134 on which the lug 133 is mounted. The rack 132 and its extension 134 are slidable in the groove formed between the usual front of the typewriter carriage and a plate 135 secured to the front of said carriage. The line-spacing mechanism may include the usual means for adjusting the throw of the platen at each line-spacing operation.

At the time that the typewriter carriage is arrested, a finger 136 thereon strikes a cam 137 forming part of the right-hand margin stop, and rocks the rod 118 rearwardly by said cam, this being accomplished by having the cam splined on said rod and slidable with the margin stop. When the carriage thus rocks the rod 118, it disconnects the clutch 92 and arrests the carriage.

To do this there is provided, depending from the rod 118 a rock arm 138, and this rock arm is pivotally connected to a link 139, curved outwardly so as to clear intervening mechanism, and rising at its rear end where it is pivoted (Fig. 5) to a rock arm 140 fast on the short shaft to which bell crank 103 is fast. Since the depending arm 138 is rocked forwardly when the right-hand margin space arrests the carriage, it moves the front part of the clutch 92 forwardly by the link 139, thereby disconnecting the clutch as described above.

At the same time the electric circuit which has been meantime driving the carriage-return mechanism, is broken. The circuit which was originally closed by moving the link 76 forwardly and closing the switch 71, has been kept closed in the meantime by a connection on the usual spring-barrel which drives the typewriter carriage in letter-feeding direction. To accomplish this the spring barrel is provided with a ring 141 which frictionally engages it and has an arm 142 attached thereto and adapted to swing against a bell crank projection 143 of the switch 71. The arm 142 during the return of the carriage is swung against the projection 143, and therefore holds switch 71 closed until the carriage is arrested. As soon, however, as the carriage is arrested, the carriage feeds forward a letter space while the usual letter-feeding dogs of the escapement are catching hold. This slight forward feeding rotates the ring 141 away from the projection 143 and allows the switch 71 to be opened by a spring 144. Thus the travel of the carriage itself keeps the carriage-return switch closed during the return of the carriage. The motor may then run idly until it stops.

In addition to keeping the switch 71 closed during the return of the carriage, the ring 141 is also adapted to prevent any one of the tabulating keys 32 from being operated during the return of the carriage. For this purpose the ring 141 is provided with a lug 145, which during the return of the carriage swings directly over a rock arm 146, fast on the usual rock shaft 39 by which the tabulating keys release the typewriter carriage. This rock shaft 39 it will be remembered, is fast to a universal bar 37 overlying shelves on the decimal tabulating plungers 34 which are described above. Since the lug 145 lies vertically over the rock-arm 146, it locks said rock-arm, and therefore locks the plungers 34 against being operated while the driving spring-barrel 15 holds the ring 141 out of its normal position. The ring 141 may be prevented from turning out of its proper working position by the arm 142 thereof, which when turning in one direction strikes the arm 146, and when turning in the other direction the arm 142 strikes a pin 146ª on the arm 146.

The tappet or dog 22 which selects the denominations in which computing is done, is of the usual form, being mounted on the usual block 147 pivoted on the usual rod 148 and adapted to coöperate with the usual rack 149 which holds the dog adjusted at any desired letter space. The dog, as usual, is formed as a one-way pivoted cam 150. The dog 22 in the usual Underwood-Hanson machine is normally in ineffective position below the jacks 23 through which it is effective on the computing mechanism. In the computing zone the dog 22 is raised to effective position by the usual cam ends of the silencing roll 151 which, as usual, is pivotally mounted on a rock shaft 152 in the frame of the machine, said shaft carrying said roll by two rock-arms 153 on which the roll is journaled. Since when the tabulating key is depressed the carriage travels rapidly to the new computing position, and thereby actuates the denomination selecting parts very rapidly, it is desirable to reduce the ensuing wear and tear on the machine by moving said roll 151 to its ineffective position, thus making the dog 22 ineffective on the denomination selecting mechanism for the moment. In a co-pending application, Serial No. 466,836, filed December 10, 1908, I have shown how this may be done manually though automatically. In order, however, to relieve the operative of the labor and consequent distraction of depressing the tabulating keys 32 against the pressure of the spring 154 which encircles the shaft 152 and normally holds the silencing roll 151 effective, I have provided a power connection for bringing about this result. To accomplish this I utilize the pulley 155 by which the belt 98 turns the shaft 99. To thus utilize this pulley 155 I have provided, loosely mounted on said pulley, a cam member 156 which is adapted to be intermittently gripped to said pulley and thus actuate a follower 157 which moves the roll 151 into ineffective position, thereby making the denomination selecting dog 22 ineffective. To accomplish this the cam 156 is provided with a high portion 158 which moves the follower 157 to the position in which it silences the silencing roll 151, and with a low portion 159 which allows the spring 154 to hold up the silencing roll 151 and support the denomination selecting dog in its effective position. To actuate the cam 156, it is provided with a clutch which is caused to seize and then release at the end of a half revolution. This clutch is controlled by the tabulating keys 32 through the universal bar 37 in such a way that whenever any tabulating key 32 is depressed the clutch is allowed to seize, thus causing the pulley 155 to rotate the high portion 158 of the cam to the point seen in Fig. 7, in which the silencing roll 151 is held in its outward ineffective position. The connections for doing this include a rock-arm 160 fast on the rock shaft 39, to which is pivoted an upwardly extending link 161 adapted to control the clutch and cam 156. To control said clutch the link 161 is pivoted to an arm 162 which is fast to two dogs 163 and 164, said dogs controlling the clutch by means of a lug 165 projecting therefrom. Whenever a tabulating key is depressed it raises the link 161 through the universal bar 37 and causes the dog 164, which has been engaging the lug 165, to release said lug, thereby causing the clutch to seize and make a half revolution carrying the high point 158 of the cam 156 around in the direction of the arrow, so that said high point takes the position seen in Fig. 7, in which position the roll 151 is swung outwardly, the dog 22 is ineffective, and the pulley 155 is rotating idly. In this position the dog 163 is holding the clutch ineffective by holding the high point 158 of the cam 156 at the position seen in Fig. 7. As soon, however, as the depressed tabulating key 32 is released, the dog 163 swings to the position seen in Fig. 9, releasing the lug 165, which then revolves until it strikes the dog 164, in which position it is arrested with the low part 159 of the cam 156 against the follower 157. In this position the spring 154 has swung the silencing roll 151 into position where it supports the dog 22 in effective position. The pulley 155 is driven at this time because the rock-arm 146 is connected to an extension 165ª of the lever 81 by means of a normally ineffective spring 165ᵇ, with the result that when a tabulating key 32 is depressed, it lifts the rock-arm 146 and tensions the spring 165ᵇ to close the switch 71, thereby starting the motor.

The lug 165 is effective to control the clutch because it is formed as an extension of an annular ring 166 which surrounds the shaft 99 and carries seizing rolls 167 to either effective or ineffective position between the shaft 99 and the body of the cam 156. The lug 165 projects through an opening 168 in the body 168ª, and is constantly pressed by a spring 169 to carry the rolls 167 from pockets 170 in which they run idly in their normal position, into effective position.

where the rolls jam between the shaft 99 and the body, beyond the pockets 170. When so jammed the shaft 99 and the ring 166 rotate as a unit until the lug 165 strikes the dog 164 which stands in its path, and arrests the lug 165, thereby holding the rolls 167 so that when the pockets 170 come opposite them, the body of the clutch will be free of the shaft 99. This permits the lug 165 to positively arrest the cam 156, because the lug 165 collides with the end of the opening 168 of the cam body through which it projects.

The friction between the shaft 99 and the body of the cam where it is journaled on the shaft 99 tends to make the cam 156 bear against one or the other of the lugs 164 or 163, and therefore there is no possibility of the cam coming to rest at an intermediate position.

In addition to means for automatically returning the carriage, I have provided a carriage-return key 174 which is located adjacent the typewriter keyboard, and has a downwardly extending arm 175, said arm connected through a pin 176, working in a slot 177, to an arm 178 which is fast on a rock shaft 179, said shaft carrying an upstanding rock-arm 180 which is pivotally attached to the forward end of the draw link 76. The result is that whenever the key 174 is depressed it draws the link 76 forward and closes the motor circuit through the switch 71. At the same time the depression of the key 174 closes the clutch 92, this being accomplished by a spring 181 which bears against a pin 182 on the locking bail 74 and whenever the key 174 is depressed draws the locking bail 74 forward to locking position, thereby drawing the link 109 forward and causing the clutch 92 to seize precisely as the link 109 causes said seizing in the automatic return of the carriage. The locking bail 74 is provided with a light returning spring 183 which is not sufficiently strong to make the operation of the arm 73 difficult. Said spring, however, is strong enough to swing the lever 114 clear of the bell crank 103.

The electric bridge which forms part of the computing drive clutch and is controlled by the lug 47 is shown dissected in Fig. 2. In this figure is shown a disk 171 having an insulated portion 172 thereon, said disk being insulated from the lug 47, but the two always revolving together. In its normal position the lug 47 holds the insulated portion 172 against a spring contact arm 173, said arm forming part of an electric circuit which is completed by the disk 171 and another similar arm 173. Owing to the fact that one of the arms 173 normally rests on the insulated portion 172, the circuit is normally open, but whenever the starting pin 46 is raised, the lug 47 jumps forward and closes the circuit through the arms 173 and the disk 171. The motor then turns until the insulated portion 172 again reaches the arm 173, cutting the current off, and therefor the motor stops when its momentum ceases to carry it around. The motor while turning tends to close its clutch by carrying the rolls 49 to jamming position, and it is caused to have this tendency because spring-pressed studs 184 pass through openings in the roll-carrier 50$^a$ and bear against the hub 52.

The electrical connections between the switch 71, the motor and the connection controlled by the lug 47 are diagrammatically shown in Fig. 8, wherein the junction box 84 has leading to it two mains 185, 186, which are respectively attached to the terminals 89 and 187 and from the terminal 187 a conductor leads to the motor, with the result that the main 186 is always connected to the motor, while the main 185 may be connected either through the clutch which is controlled by the lug 47 or by the switch 71, the terminal 89 being connected to the clutch switch 47, 173 by a cable 188.

In the above description the mechanical structure has been principally dwelt on. A few practical methods of using the machine are worth noting. The machine may be provided with the subtraction devices shown in the co-pending application, Serial No. 626,550, filed May 11, 1911, (now Patent No. 1,278,812, dated Sept. 10, 1918) and then the carriage of the typewriter on reaching the end of a line, will cause the margin stop to return the carriage to turn the platen to carry the numbers into the computing wheels, and, incidentally, to return the machine from the subtracting position in which it has been placed by the subtraction handle, so that it now adds.

In the hands of a skilled operative, the margin stops will be used extensively in making out bills, statements, etc., for this purpose almost taking the place of a tabulating device. In making out bills and statements, a skilled operative will repeatedly readjust the magin stops, so that each column is made out correctly, and the carriage is repositioned automatically to the correct column, requiring only the depression of a decimal tabulating key to bring it to the correct letter space. To accomplish such results, the machine may be provided with a plurality of registers, which may have their denomination selectors arranged as shown in application, Serial No. 466,836, filed December 10, 1908, with the result that each register may have certain denomination selectors effective exclusively on it, while at the same time each register may have a plurality of denomination selectors for the purpose of doing cross addition or cross subtraction. This machine is preferably arranged to always add when any register adds, or always subtract when any register subtracts, and a method of operating this machine for such purposes as making out bills, is set forth in my co-pending application, Serial No. 72,015 filed Jan. 14, 1916.

It will be noted, among other things, that by properly positioning the left-hand margin stop, the typewriter carriage will be returned immediately on writing the last digit of a number, and when set at subtraction, in a subtraction machine of the type referred to above, said machine will by the ensuing actuation of the general operator automatically be effective to add the next number written. The starting key 174 thus becomes a computing key for cross adding and similar purposes, while the left-hand margin stop takes the place of a carriage-return and line-spacing key.

Variations may be resorted to within the scope of the invention, and portions of the improvements may be used without others.

Having thus described my invention, I claim:

1. In a combined typewriting and computing machine, the combination with a typewriter traveling carriage, and typewriter numeral keys, of computing devices in which numbers are registered in orders controlled by said carriage, tabulating keys for positioning said carriage, a source of power for operating said computing devices, a tripping device operated by said carriage for selecting the orders in said computing devices, and means whereby said source of power makes said tripping device ineffective when a tabulating key is depressed.

2. In a combined typewriting and computing machine, the combination wth a typewriter traveling carriage and typewriter numeral keys, of computing devices in which numbers are registered in orders controlled by said carriage, tabulating keys for positioning said carriage, a source of power for returning said carriage to begin a new line, a tripping device operated by said carriage for selecting the orders in said computing devices, and means operated by said source of power for making said tripping device ineffective when a tabulating key is depressed.

3. In a combined typewriting and computing machine, the combination with a typewriter traveling carriage, and a rotatable platen forming part of said carriage, of a motor for returning said carriage to begin a new line, a shiftable stop for arresting said carriage, a member forming part of said stop, connections operated by said member for line-spacing said platen, and means operated by said stop for disconnecting said motor from said carriage.

4. In a combined typewriting and computing machine, the combination with a typewriter traveling carriage, and a rotatable platen forming part of said carriage, of a motor for returning said carriage to begin a new line, a shiftable stop for arresting said carriage, a member forming part of said stop, connections operated by said member for line-spacing said platen, means operated by said stop for disconnecting said motor from said carriage, and another settable stop for arresting said carriage at the end of a typewritten line and adapted to connect said motor to the carriage.

5. In a combined typewriting and computing machine, the combination with a typewriter traveling carriage, and a rotatable platen forming part of said carriage, of a motor for returning said carriage to begin a new line, a shiftable stop for arresting said carriage, a member forming part of said stop, connections operated by said member for line-spacing said platen, means operated by said stop for disconnecting said motor from said carriage, and a key operable to connect said carriage to said motor to cause the carriage to be returned at will.

6. In a combined typewriting and computing machine, the combination with a typewriter traveling carriage, and typewriter numeral keys, of computing devices in which numbers are registered in orders controlled by said carriage, tabulating keys for positioning said carriage, a tripping device for selecting the orders in said computing devices, a normally idle motor for driving said computing devices, means for starting said motor by the depression of any tabulating key, and means whereby said motor is caused by the depression of any tabulating key to positively move said tripping device to ineffective position.

7. In a computing machine, the combination with a motor, of a carriage, an oscillating member, a clutch between said carriage and said motor, a clutch between said motor and said oscillating member, a denomination selecting device under the control of said oscillating member, and keys for selectively connecting said motor to operate either said oscillating member or said carriage.

8. In a computing machine, the combination with a motor, of a carriage, an oscillating member, a clutch between said carriage and said motor, a clutch between said motor and said oscillating member, a denomination selecting device under the control of said oscillating member, computing devices, a general operator for driving said computing devices, and keys for selectively connecting said motor to operate either said oscillating member or said carriage or said general operator.

9. In a computing machine, the combination with a motor and a normally open electric circuit for driving it, of a carriage, an oscillating member, a clutch between said carriage and said motor, a clutch between said motor and said oscillating member, a denomination selecting device under the control of said oscillating member, and keys for closing said circuit and selectively connecting said motor to operate either said oscillating member or said carriage.

10. In a computing machine, the combination with a motor and a normally open electric circuit for driving it, of a carriage, an oscillating member, a clutch between said carriage and said motor, a clutch between said motor and said oscillating member, a denomination selecting device under the control of said oscillating member, computing devices, a general operator for driving said computing devices, and keys for closing said circuit and selectively connecting said motor to operate either said oscillating member or said carriage or said general operator.

11. In a combined typewriting and computing machine, the combination with a traveling carriage, and a tripping device connected to said carriage and forming a denomination selector, of a belt for driving said carriage, a pulley by which said belt drives the carriage, a clutch between said pulley and said carriage, a cam, connections from the cam adapted to move said tripping device, and a clutch between said pulley and said cam.

12. In a combined typewriting and computing machine, the combination with a traveling carriage, of a belt for returning it, a pulley driven by said belt, a clutch between said pulley and said carriage adapted to drive said carriage, computing mechanism forming part of said machine, a device effective on said computing mechanism, and a clutch between said pulley and said device adapted to move it to and from effective position.

13. The combination with a motor, of a computing mechanism comprising a denomination selector adapted to be moved to effective or ineffective position, a cam, connections from the cam for so moving it, a clutch for causing said motor to drive said cam, and an escapement forming part of said clutch adapted to hold said cam in either of two positions.

14. In a combined typewriting and computing machine, the combination with a traveling typewriter carriage and a normally idle motor, of computing mechanism adapted to be driven by said motor, a tripping device forming a denomination selector connected to said carriage, a support for said selector, tabulating keys for positioning said carriage, power driven means for moving said selector support to ineffective position, a universal bar moved by said tabulating keys, and a circuit-closing device moved by said universal bar to start said motor.

15. In a combined typewriting and computing machine, the combination with a traveling carriage and a motor, of tabulating keys for positioning said carriage, a tripping device forming part of said carriage, a circuit comprising a switch controlling said motor, a universal bar operated by said keys controlling said switch, a member also controlled by said universal bar controlling said tripping device but operated by said motor, and a stop operated by said carriage also controlling said switch.

16. In a combined typewriting and computing machine, the combination with a traveling carriage and a motor, of tabulating keys for positioning said carriage, a tripping device forming part of said carriage, a support for said device, a circuit comprising a switch controlling said motor, a universal bar operated by said keys controlling said switch, means for moving said support to ineffective position, an escapement mechanism forming part of a clutch for operating said means, and a stop operated by said carriage also controlling said switch.

17. In a computing machine, the combination with a traveling carriage and a denomination selector, of a motor, a support for the selector, means for moving said selector support to ineffective position, a clutch between said motor and said means by which it is moved, and an escapement for detaining said means in either its effective or ineffective position and controlling said clutch.

18. The combination with a denomination selector, and a support therefor, of a rotatable cam, connections from the cams for moving the support to ineffective position, a motor, a clutch between said motor and said cam, said clutch normally tending to close, and a key-controlled dog holding said clutch normally open.

19. The combination with a denomination selector and a support therefor, of a rotatable cam, connections from the cam for moving the support to ineffective position, a motor, a clutch between said motor and said cam, said clutch normally tending to close, dogs adapted to hold said clutch released in two positions only, and a key controlling said dogs adapted to hold said cam in one position when depressed and another position when released.

20. In a combined typewriting and computing machine, the combination with a motor, of devices in which numbers are temporarily set up, numeral keys and a typewriter carriage coöperating to so set them up, a key for causing said motor to complete the computation of the set-up numbers, a carriage-return device operated by said motor, a key controlling said carriage-return, an automatic line-spacing device operated by said carriage at the end of its return, a denomination selector, a support therefor, motor means for making said selector support ineffective, a carriage-operated automatic connection for causing the computation of the numbers, and connections whereby the motor is simultaneously started and stopped as it is connected to and disconnected from the devices it operates.

21. In a combined typewriting and computing machine, the combination with a tabulating device, of a typewriter carriage on which said tabulating device is effective, a denomination selector, a support therefor, a motor, means for automatically returning said carriage by said motor, connections from said motor making said selector support ineffective, and a margin stop for determining how far said carriage shall so be returned.

22. In a combined typewriting and computing machine, the combination with a tabulating device, of a typewriter carriage on which said tabulating device is effective, a denomination selector, a support therefor, a motor, means for automatically returning said carriage by said motor, connections from said motor making said selector support ineffective, a margin stop for determining how far said carriage shall so be returned, numeral keys forming part of the typewriter, pin bars on which numbers are temporarily set up by said numeral keys, and means for registering the set-up numbers by said motor.

23. In a combined typewriting and computing machine, the combination with a tabulating device, of a typewriter carriage on which said tabulating device is effective, a denomination selector, a support therefor, a motor, means for automatically returning said carriage by said motor, connections from said motor making said selector support ineffective, a margin stop for determining how far said carriage shall so be returned, and another margin stop for determining when the motor shall be effective to return said carriage.

24. In a combined typewriting and computing machine, the combination with a tabulating device, of a typewriter carriage on which said tabulating device is effective, a denomination selector, a support therefor, a motor, means for automatically returning said carriage by said motor, a margin stop for determining how far said carriage shall so be returned, another margin stop for determining when the motor shall be effective to return said carriage, connections from said motor making said selector support ineffective, numeral keys forming part of the typewriter, pin bars on which numbers are temporarily set up by said numeral keys, and means for registering the set-up numbers by said motor.

25. In a combined typewriting and computing machine, the combination with a tabulating device, of a typewriter carriage on which said tabulating device is effective, a motor, means for automatically returning said carriage by said motor, a margin stop for determining how far said carriage shall so be returned, a denomination selector connected to the typewriter carriage, and means operated by the motor for making said selector ineffective, 26. In a combined typewriting and computing machine, the combination with a tabulating device, of a typewriter carriage on which said tabulating device is effective, a motor, means for automatically returning said carriage by said motor, a margin stop for determining how far said carriage shall so be returned, a denomination selector connected to the typewriter carriage, and means operated by the motor for making said selector ineffective, said last-named means including the tabulating device for positioning said carriage.

27. In a computing machine, the combination with a traveling carriage and numeral keys, of computing devices in which numbers are registered in orders controlled by said carriage, tabulating keys for positioning said carriage, a motor for operating said computing devices, a tripping device operated by said carriage for selecting the decimal orders in said computing devices, and means whereby said motor makes said tripping device ineffective when a tabulating key is depressed.

28. In a computing machine, the combination with a traveling carriage and nueral keys, of computing devices in which numbers are registered in orders controlled by said carriage, tabulating keys for positioning said carriage, a motor for operating said computing devices, a tripping device operated by said carriage for selecting the decimal orders in said computing devices, means whereby said motor makes said tripping device ineffective when a tabulating key is depressed, a margin stop for determining how far said carriage shall return, and means for disconnecting the motor from the carriage by said margin stop.

29. In a computing machine, the combination with a traveling carriage and numeral keys, of computing devices in which numbers are registered in orders controlled by said carriage, tabulating keys for positioning said carriage, a motor for operating said computing devices, a tripping device operated by said carriage for selecting the decimal orders in said computing devices, means whereby said motor makes said tripping device ineffective when a tabulating key is depressed, a margin stop for determining how far said carriage shall return, means for disconnecting the motor from the carriage by said margin stop, and a second margin stop for causing said carriage to start to return.

30. In a computing machine, the combination with a traveling carriage and numeral keys, of computing devices in which numbers are registered in orders controlled by said carriage, tabulating keys for positioning said carriage, a motor for operating said computing devices, a tripping device operated by said carriage for selecting the decimal orders in said computing devices, means whereby said motor makes said tripping device ineffective when a tabulating key is depressed, a margin stop for determining how far said carriage shall return, means for disconnecting the motor from the carriage by said margin stop, a second margin stop for causing said carriage to start to return, a platen, and a line-spacing device operated by said second margin stop.

31. In a combined typewriting and computing machine, the combination with a traveling carriage and computing mechanism, of a general operator for said computing mechanism, power-driven means for actuating said general operator, a device settable to make said means effective at the close of a computing zone, power-driven means for returning said carriage and effecting a line-spacing operation, and a carriage-stop separately settable to cause said last-named means to operate.

32. In a combined typewriting and computing machine, the combination with a traveling carriage and computing mechanism, of a general operator for said computing mechanism, power-driven means for actuating said general operator, a device settable to make said means effective at the close of a computing zone, power-driven means for returning said carriage and effecting a line-spacing operation, a carriage-stop separately settable to cause said last-named means to operate, a single motor normally idle and adapted to drive said power-driven means, and connections whereby the motor is automatically started to drive either of said means.

FREDERICK A. HART.

Witnesses:
ARTHUR A. JOHNSON,
EDITH B. LIBBEY.